US008529138B2

(12) United States Patent
Duis et al.

(10) Patent No.: US 8,529,138 B2
(45) Date of Patent: Sep. 10, 2013

(54) FERRULE FOR OPTICAL TRANSPORTS

(75) Inventors: Jeroen Antonius Maria Duis, Didam (NL); Jan Willem Rietveld, Benschop (NL); Marcellus Petrus Josephus Buijs, Ede (NL); Ton Antonius Bernardus Gerardus Bolhaar, Ophemert (NL); Joseph Gerardus Maria Vos, Elsendorp (NL); Shelly A. Buchter, East Berlin, PA (US); Douglas Harold Rohde, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 427 days.

(21) Appl. No.: 12/837,019

(22) Filed: Jul. 15, 2010

(65) Prior Publication Data

US 2012/0014648 A1 Jan. 19, 2012

(51) Int. Cl.
*G02B 6/00* (2006.01)
*G02B 6/36* (2006.01)

(52) U.S. Cl.
USPC .................. 385/59; 385/78; 385/83; 385/137

(58) Field of Classification Search
USPC ...................................... 385/139, 78, 83, 115
See application file for complete search history.

(56) References Cited

U.S. PATENT DOCUMENTS

| | | | | |
|---|---|---|---|---|
| 5,257,334 A * | 10/1993 | Takahashi | ........................ | 385/65 |
| 5,394,495 A | 2/1995 | Booth et al. | | |
| 5,603,870 A * | 2/1997 | Roll et al. | ..................... | 264/1.25 |
| 6,027,253 A * | 2/2000 | Ota et al. | ........................ | 385/83 |
| 6,097,871 A | 8/2000 | De Dobbelaere et al. | | |
| 6,367,985 B1 | 4/2002 | Lee et al. | | |
| 6,424,785 B1 * | 7/2002 | Melchior | ........................ | 385/139 |
| 6,474,877 B1 * | 11/2002 | Shahid | ............................. | 385/65 |
| 6,474,878 B1 * | 11/2002 | Demangone | ..................... | 385/78 |
| 6,519,393 B2 | 2/2003 | Booth et al. | | |
| 6,631,228 B2 | 10/2003 | Gao et al. | | |
| 6,798,968 B2 * | 9/2004 | Ten Eyck | ....................... | 385/137 |
| 6,816,654 B1 * | 11/2004 | Grabbe | ............................ | 385/52 |
| 6,819,858 B2 * | 11/2004 | Steinberg et al. | ............. | 385/137 |
| 6,859,588 B2 * | 2/2005 | Kim et al. | ........................ | 385/49 |
| 7,369,728 B1 | 5/2008 | Hasegawa et al. | | |
| 7,447,405 B1 | 11/2008 | Yamada et al. | | |
| 2004/0208455 A1 | 10/2004 | Yang et al. | | |

FOREIGN PATENT DOCUMENTS

WO WO 97/34179 A1 9/1997

OTHER PUBLICATIONS

"Polyguide(tm) Polymeric Technology for Optical Interconnect Circuits and Components", Booth et al., DuPont Company, date unknown.
Article obtained from www.thefreelibrary.com; "Siemens Fiber Optics and AMP Enter Multisource Agreement for Multi-Gigabit Parallel Optical Links", Business Wire, Feb. 23, 1998.

(Continued)

*Primary Examiner* — Eric Wong

(57) ABSTRACT

The invention pertains to a ferrule for aligning optical transports within an optical connector for coupling to a mating optical connector for purposes of aligning the optical transports in the first connector with optical transports in the mating connector. The ferrule comprises a main body portion defining a longitudinal cavity running between a front face and the rear face of the main ferrule body. The cavity has an opening to a lateral side of the ferrule main body that permits the installation of optical transports into the cavity from a lateral direction (as well as still permitting longitudinal installation, if desired). A cover may be provided for closing off the lateral opening after the optical transports are installed in the cavity.

21 Claims, 11 Drawing Sheets

(56) References Cited

OTHER PUBLICATIONS

Article obtained from www.highbeam.com; "Infineon Technologies Licenses Parallel-Optical-Link—PAROLI—Modules to Molex, Crating Second Source for High-Performance Fiber Optic Data Link", Business Wire Press Release, Aug. 25, 2000.
"VCSELs for datacom applications", Wipiejewski et al., date unknown.
"PAROLI", obtained from hsi.web.com; date unknown.
Data Sheet; "Parallel Optical Link Transmitter: PAROLI(r) 2 Tx AC, 1.25 Gbit/s" and "Parallel Optical Link Receiver: PAROLI(r) 2 Rx AC, 1.25 Gbit/s"; Infineon Technologies, Nov. 19, 2003.
Color photographs of actual Infineon PAROLI device of Non-Patent Literature Iten No. 6; date unknown.
International Search Report, International Application No. PCT/US2011/001189, International Filing Date Jul. 7, 2011.

* cited by examiner

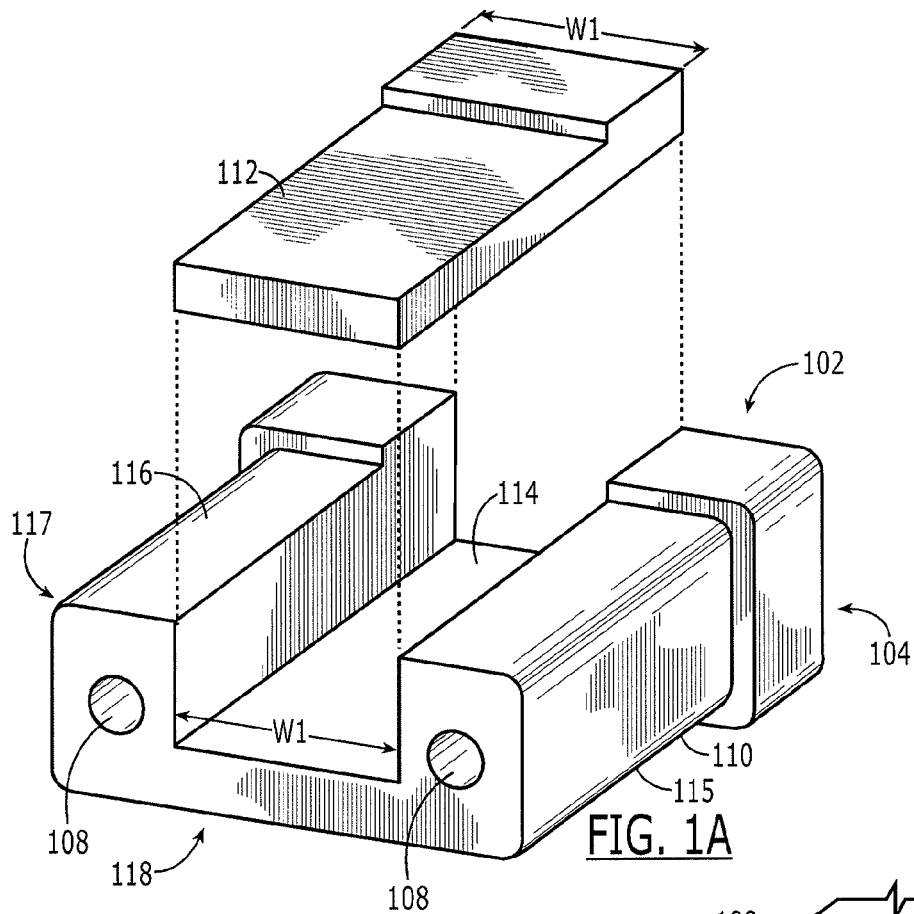
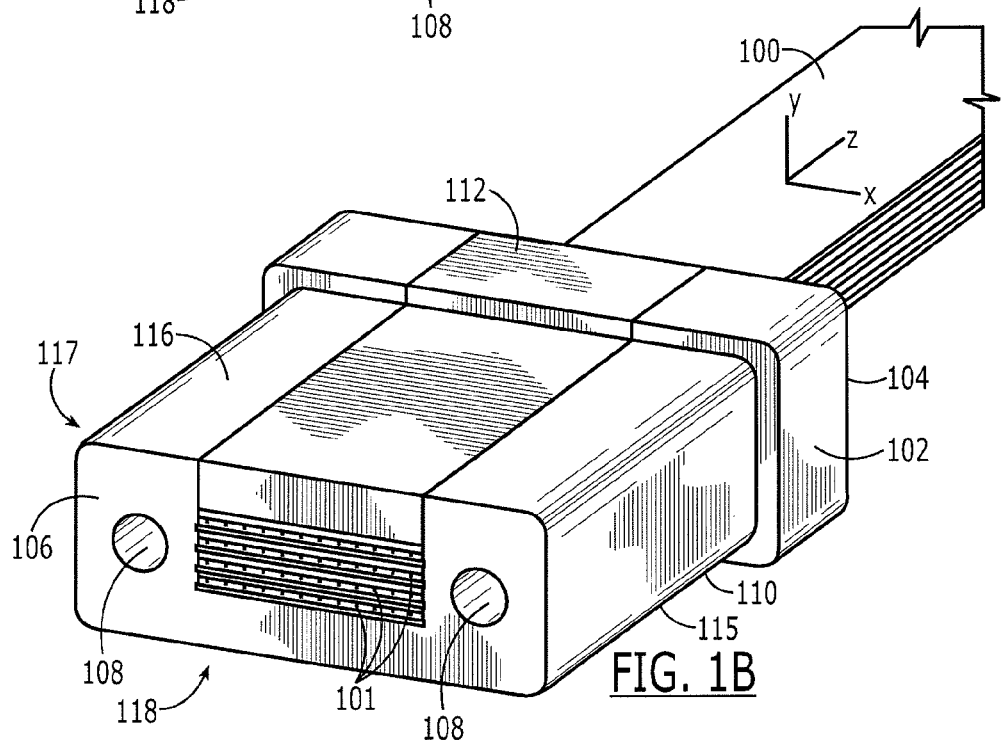

FERRULE FOR OPTICAL TRANSPORTS

FIELD OF TECHNOLOGY

The invention pertains to optical connectors. More particularly, the invention pertains to a ferrule that is particularly suited to ease assembly of a plurality of optical transports in the ferrule.

BACKGROUND

It is typically the case that an optical signal transported over an optical fiber or waveguide (hereinafter collectively optical transport) must be coupled from that optical transport to another optical transport or to an optoelectronic device. Typically, the end of the optical transport is assembled to an optical connector of a given form factor, e.g., MT, which connector can be coupled to a mating optical connector on the other optical transport (or optoelectronic device).

Optical cables that are connected to each other through a pair of mating connectors may comprise a single optical transport. However, more and more commonly, optical cables contain a plurality of optical transports, and the light in each optical transport in the cable is coupled through a pair of mating connectors to a corresponding optical transport in another cable. Optical cables and connectors having more than 1000 transports or more are now available on the market.

In a typical optical fiber, for instance, the light is generally contained only within the core of the fiber, which typically may be about 10 microns in diameter for a single-mode fiber or about 50 microns in diameter for a multi-mode fiber. Waveguides are about equally as small in cross-section. Accordingly, lateral alignment of the transports in one connector with the transports in the other connector must be very precise. Hence, optical connectors generally must be fabricated extremely precisely to ensure that mating optical transports longitudinally align as well as possible so that as much light as possible is transmitted through the mating connectors to minimize signal loss during transmission.

Typically, an optical connector comprises a ferrule assembly that includes a separate cavity for each optical transport in the cable. Each optical transport is inserted into one of the cavities, which precisely aligns the transport laterally, i.e., horizontally and vertically (x and y planes) relative to some reference point on the ferrule assembly, such as an alignment pin or alignment hole that will mate with a corresponding alignment hole or pin on a mating connector. The optical transports will then be cut or polished flush with the front face of the ferrule assembly to align the ends of the transports in the longitudinal direction (z direction).

The ferrule assembly then is placed in a connector housing that typically includes a mechanism for guiding the ferrule into engagement with the ferrule of a mating connector as well as a mechanism for releasably locking the two connectors together.

Such ferrules are commonly manufactured by injection molding and are relatively expensive and complex to manufacture because they have complex shapes and require significant polishing of many surfaces in order to achieve the desired tolerances. Typical tolerances for optical transport alignments are about 1-2 microns.

SUMMARY

The invention pertains to a ferrule for aligning optical transports within an optical connector for coupling to a mating optical connector for purposes of aligning the optical transports in the first connector with optical transports in the mating connector. The ferrule comprises a main body portion defining a longitudinal cavity running between a front face and the rear face of the main ferrule body. The cavity has an opening to a lateral side of the ferrule main body that permits the installation of optical transports into the cavity from a lateral direction (as well as still permitting longitudinal installation, if desired). A cover may be provided for closing off the lateral opening after the optical transports are installed in the cavity.

BRIEF DESCRIPTION OF THE DRAWINGS

FIG. 1A is a perspective view of a ferrule in accordance with a first embodiment of the invention.

FIG. 1B is a perspective view of the ferrule of FIG. 1A assembled with to the end of an optical cable having multiple optical transports.

DETAILED DESCRIPTION OF EMBODIMENTS

Figure 2:
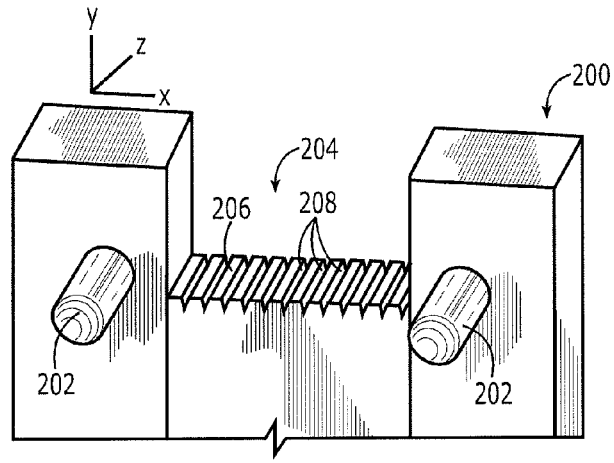
FIG. 2 is a perspective view of a first jig for assembling optical transports to a ferrule in accordance with the first embodiment of the invention.

FIG. 1A is a blow-up perspective view of a ferrule 102 in accordance with one embodiment of the present invention. FIG. 1B is a perspective view of an optical transport cable 100 terminated within the ferrule 102 in accordance with the first embodiment of the invention. The exemplary cable comprises 48 optical transports 101 arranged as four stacked waveguide layers 103, each comprising 12 optical transports 101. The ferrule may further be encased within a connector housing adapted to mate with a corresponding connector to provide a complete optical cable assembly. However, in order not to obfuscate the invention, only the ferrule and the cable are shown in all the drawings and no connector housing is shown, it being understood that the assembled ferrule/cable combination would generally further be assembled to a connector housing to complete a cable assembly. The ferrule comprises a main body 110. As is common, the ferrule body 110 comprises a front face 106 at which face the optical transports 101 in the cable are terminated for mating with a next cable assembly or an optoelectronic device and a rear face 104 through which the cable 100 enters the ferrule. This exemplary ferrule main body 110 is generally rectilinear, and therefore has four lateral faces running longitudinally between the front and rear faces 104, 106, namely a right side face 115, a top face 116, a left side face 117, and a bottom face 118. Cylindrical and other-shaped ferrules are also well known. Further, as is typical, the front face 106 of the ferrule 102 includes one or more alignment mechanisms for aligning the ferrule (and, thus, the optical transports within it) with the ferrule of a mating connector. In this case, the alignment mechanisms are alignment holes 108 for accepting mating alignment pins on a mating ferrule. Main body 110 defines a longitudinal cavity 114 running fully between the rear face 106 and the front face 108 for receiving the optical transports therethrough. Cavity 114 is generally rectilinear in this embodiment. The illustrated cavity is uniform throughout its length, but this is merely exemplary. The cavity, for instance, may have an enlarged portion at the rear of the cavity to allow for a greater thickness of adhesive for purposes of providing additional strain relief for the cable at the rear of the ferrule. Unlike most conventional ferrules, the cavity 114 for accepting optical transports also is open to a lateral side of the ferrule body 110, namely, top face 116.

In the prior art, the cavity for the optical transports typically is a throughbore with no opening to a lateral side of the ferrule body, Therefore, the optical transports must be inserted into the ferrule in the longitudinal direction (the z direction in FIGS. 1A and 1B). In the present invention, on the other hand, optical transports may be inserted into the cavity 114 in a lateral direction or a longitudinal direction.

After the ferrule and cable have been assembled together, a cover piece 112 may be inserted into the lateral opening in the ferrule main body 110 to close off the lateral opening.

Generally, the optical transports must be assembled in the ferrule with their lateral orientations extremely precisely aligned relative to the alignment mechanism (e.g., the alignment holes 108) of the ferrule so that they will align very precisely with mating optical transports in a mating connector.

FIG. 2 is a perspective view of a jig 200 designed to be used with a ferrule such as ferrule 102 to align the optical transports in the cavity of the ferrule very precisely relative to the alignment holes 108. The jig 200 includes alignment mechanisms for mating with the alignment mechanisms 108 on the ferrule. In this case, the alignment mechanisms are alignment pins 202 for mating with the alignment holes 108 in the ferrule. Of course, the pins and holes could be reverse between the jigs and the ferrules. The jig 200 includes a window 204 substantially similar in a cross section (x-y plane) to the cavity 114 of the ferrule 102. Typically, it is a window in the z direction and is open laterally at its top. The bottom surface 206 of the window 204 is serrated with a plurality of grooves 208. In one preferred embodiment, as illustrated, the grooves are generally V-shaped grooves 208. The grooves 208 are aligned very precisely in the horizontal, x direction relative to the alignment pins 202 to correspond to the desired horizontal alignment of the optical transports in the ferrule. The height of bottom wall 206 also is set very precisely relative to the height of the alignment pins 202 to correspond to the desired height of the optical transports in the ferrule 102.

To assemble the optical transports of a cable in cavity 114 of the ferrule 102 so that they are aligned highly accurately in the lateral direction (x-y), the mounting holes 108 on the ferrule 102 are inserted over the mounting pins 202 of the jig 200 to align the window 204 on the jig 200 with the cavity 114 of the ferrule 102 essentially in the same manner that the cavities of two mating ferrules would align with each other when two mating connectors are brought together. Then, the optical transports 101 will be laid in the now-aligned ferrule cavity 114 and jig window 204 with each optical transport in a corresponding V-groove 208 in order to precisely laterally (in the x-y plane) align the optical transports at the front face 106 of the ferrule 102. The optical transports 101 will be adhered in this position and then the ferrule 102 can be removed from the jig 200 and any portions of the optical transports 101 protruding beyond the front face 106 of the ferrule 102 can be removed, such as by laser cleaving, cutting, and/or abrasive polishing.

Since the jig 202 is completely uniform in the longitudinal direction (z), it can be manufactured using two dimensional wire EDM (Electron Discharge Machining), and thus can thus be manufactured very precisely yet inexpensively. Wire EDM can provide tolerances of less than 1 micron. Furthermore, the jig can be made in one quick wire EDM manufacturing process.

With respect to optical fibers, as is typical in optical connectors, the front ends of the fibers in the ferrule are stripped of their insulation, leaving only the core and cladding, which is generally cylindrical. Accordingly, when the cylindrical cores are laid into the grooves, they will sit in the grooves in a very precise position relative to the groove with the cylindrical profile making contact with the walls of the v-groove at two points.

Figure 3:
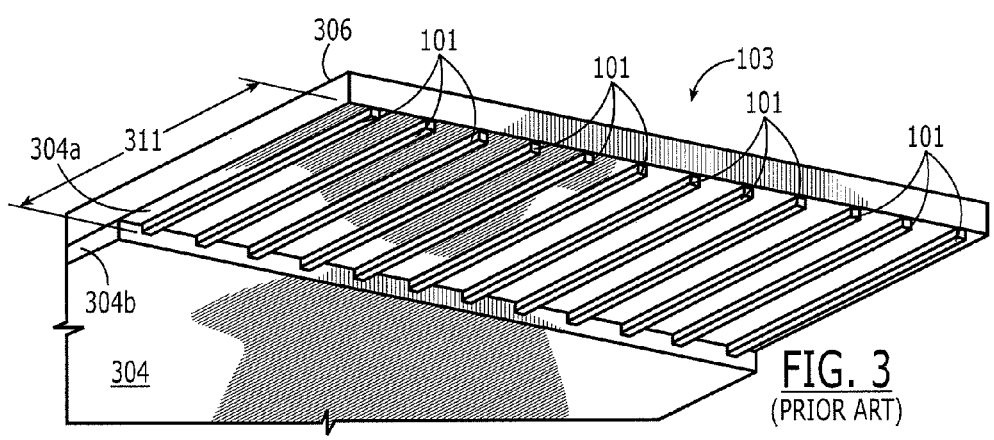
FIG. 3 is a perspective view of a row of waveguides prepared for alignment in accordance with the principles of the first embodiment of the invention.

Optical waveguides, on the other hand, are processed differently for assembly in the cavity 114 of the exemplary ferrule 102 of the invention. FIG. 3 is a perspective view of a layer of optical waveguides such as one of the layers 101 shown in FIG. 1B. It comprises twelve parallel optical wave guides 101 embedded in planar cladding 304 supported on a polymer mechanical support layer 306. Waveguides typically are manufactured in a planar manner using epitaxial layer processes commonly associated with printed circuit board manufacturing. For instance, a first layer 304a of cladding is deposited on top of a substrate of the mechanical support structure 306. (Please note that the waveguide layer 103 is shown upside down in FIG. 3 as compared its orientation during fabrication as described herein). Then, using conventional photolithography techniques, a plurality of strips of waveguide core material is deposited on top of the first cladding layer 304a to form the waveguides 101. For example, a layer of photoresist is deposited over the first cladding layer 304a, the photoresist is developed through a photolithography mask corresponding to the desired pattern of the waveguides 101, the core material, typically initially a liquid, is deposited over the developed photoresist and cured, the remaining photoresist is washed away (taking away any of the core material deposited on it, thus leaving the waveguide cores 101 on the first cladding layer 304a. Then, a second layer of cladding 304b is deposited over the first cladding layer 304a and waveguides 101.

Accordingly, in order to allow the waveguide cores 101 to be laterally aligned by placement within the V-grooves 208 of the jig 200, the waveguides are fabricated so that the second layer of cladding 304b does not cover the front ends of the wave guide (e.g., the first 2 mm of the waveguide), as illustrated in FIG. 3. For instance, the waveguide layers 103 may be manufactured using a photolithography mask for the second cladding layer 304b that causes the top layer 304b to end 2 mm short of the end of the first cladding layer 304a and the cores 101. Then, the remainder of the waveguide 300 that still includes the full cladding 304 can be placed in the cavity 114 of the ferrule 102 while the semi-exposed front ends of the cores (see reference numeral 311 in FIG. 3) extend into the window 204 of the jig with the cores 101 sitting in the v-grooves 208 of the jig 200.

The cores 101 in a layer 103 of optical waveguide are rectilinear rather than cylindrical, as they are for optical fibers. Nevertheless, the illustrated V-shaped grooves 208 actually work well for both cylindrical optical fibers and rectilinear optical waveguide cores. Specifically, the waveguide cores 101 will not rotate about their longitudinal axes because they are attached to the first cladding layer 304a. Hence, just like the cylindrical fiber cores, the waveguide cores 101 will make contact with the V-grooves 208 at two points to properly position the transport both horizontally and vertically (x and y directions). Accordingly, while the grooves 208 may be cylindrical for applications in connection with optical fibers or rectilinear in connection with applications with optical wave guides, V-shaped grooves are acceptable for both applications.

Optionally, V-grooves can also be placed in the bottom surface of the cavity 114 in the ferrule 102 to provide extra alignment precision with respect to at least the bottom-most row of optical transports.

FIGS. 4A through 4M illustrate one exemplary process for assembling a plurality of optical transports to a ferrule in accordance with the present invention. In this example, the cable comprises forty-eight cores comprised of four rows of twelve cores each.

Figure 4A:
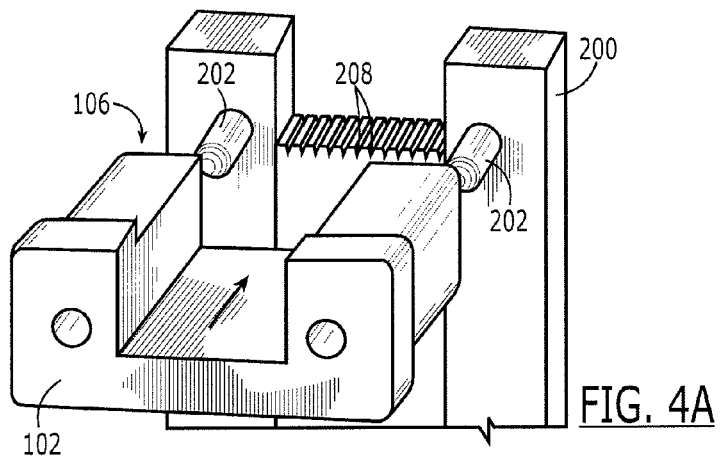
FIGS. 4A through 4O illustrate various stages in one process for assembling a ferrule with multiple optical transports in accordance with one embodiment of the invention.

Turning to FIG. 4A, the ferrule 102 is mounted on the alignment pins 208 of the jig 200 so that the front face 106 of the ferrule 102 abuts the surface 222 of the jig.

Figure 4B:
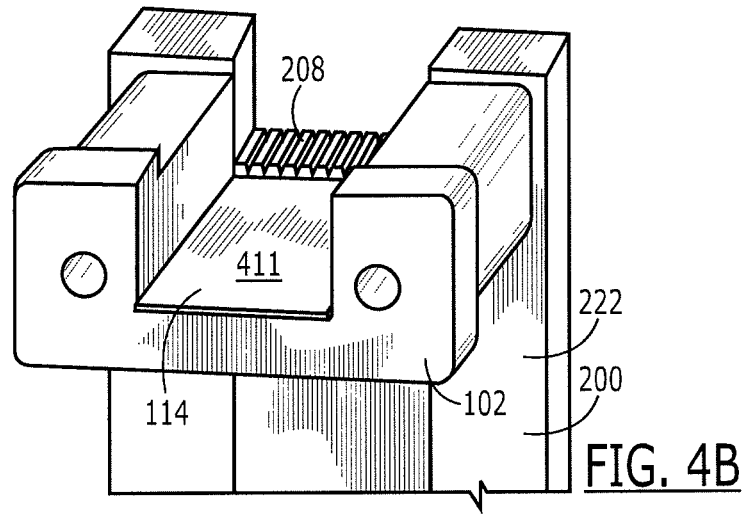
Figure 4C:
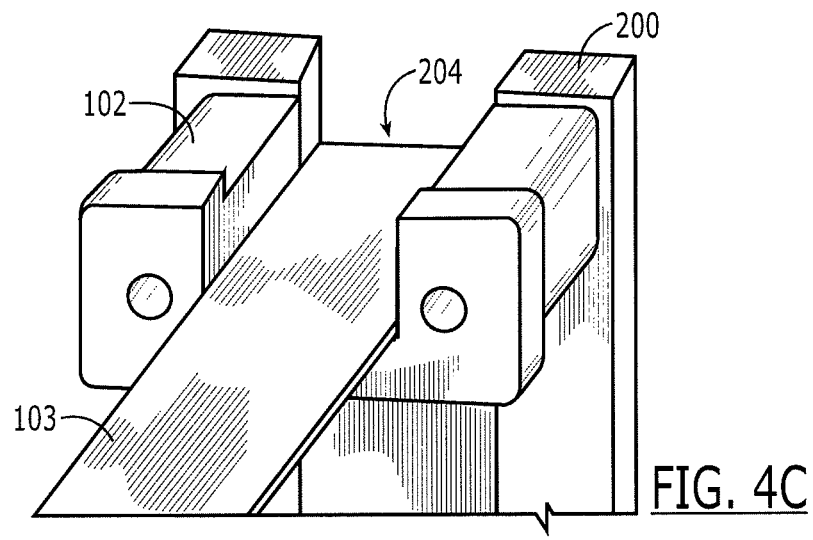
Figure 4D:
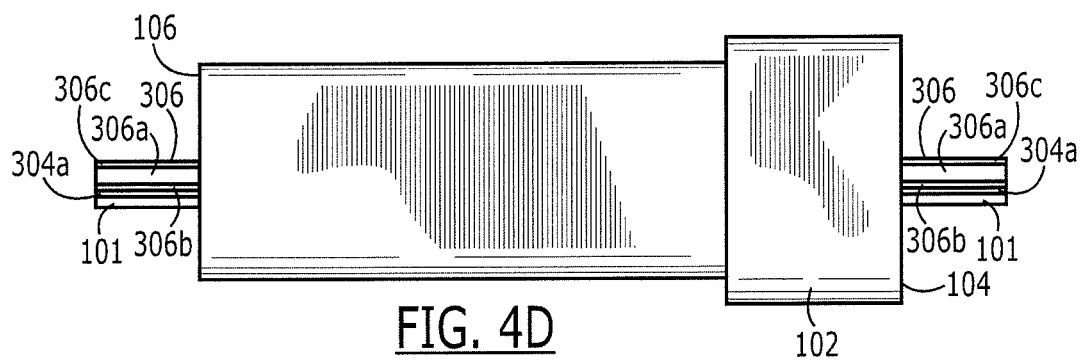

Next, as shown in FIG. 4B, a layer of adhesive 411 is deposited on the bottom surface of the ferrule window 114. Next, referring to FIG. 4C, a first optical wave guide layer 103, comprising a row of twelve cores, is placed on the adhesive 411 in the ferrule 102 with the front portion (e.g., portion 311 in FIG. 3) extending into the window 204 of the jig 200. Particularly, the front end of the wave guide is positioned so that it extends at least partially into the window 204 of the jig 200 so that the fully clad portions of the waveguide cores extend completely through the ferrule. The proper position is shown in FIG. 4D, which is a side view of the ferrule 102 and first layer of waveguides 103. As can be seen, the support substrate 306, first cladding layer 304a, and cores 101 extend past the front face 106 of the ferrule 102, while the second cladding layer 304b ends essentially at the front face 106 of the ferrule 102. In some embodiments, the jig may include one or more protrusion that prevents the front face 106 of the ferrule 102 from being inserted onto the jig 200 with the front face flush with the surface 222 of the jig 102, but instead leaving a small gap so that any tiny segment of the second cladding layer 304b sticking out past the front face 106 of the ferrule will not contact the jig and potentially interfere with the proper height alignment of the cores 101 in the V-grooves 208. However, if the distance that the second cladding layer extends beyond the front surface of the ferrule is fairly small, it is unlikely to have a significant effect on the proper height alignment of the cores.

Figure 4E:
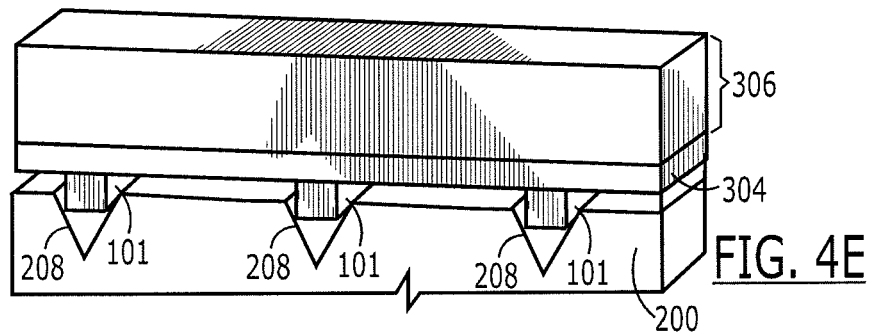

Referring to FIG. 4E, which is a close up view of the cores 101 fitting in the V-grooves 208 of the jig 200, it is seen that the cores make contact with the V-grooves at their two lower corners, thus aligning the cores horizontally (x dimension). The height of the cores 101 is substantially determined by the height of the tops of the grooves. More specifically, the portions of the cladding layer 304a between the cores rest on the tops of the grooves with the cores extending down into the grooves.

Figure 4F:
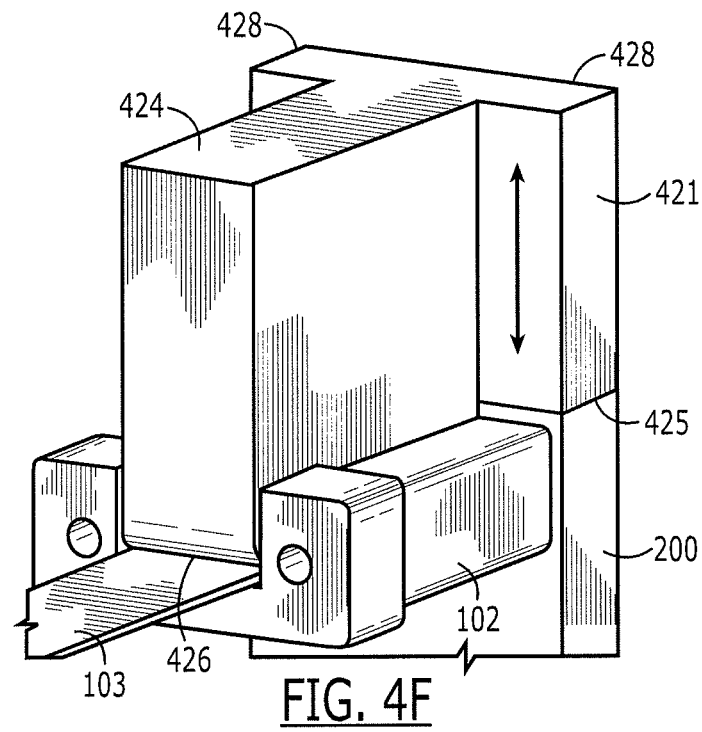

Referring next to FIG. 4F, a hot pressure/curing die tool is used to deploy a die 421 to press down on the layer 103 of wave guide cores 101 and heat up to cure the adhesive 411. Preferably, the press face 426 of the die 421 is sized and shaped to essentially fill the entire cavity 114 in the ferrule 102 so as to maintain constant pressure on the waveguide layer 103 over its entire extent in the ferrule and to evenly cure the adhesive 421. The pressure applied by the hot pressured/curing die 421 may be selected to push down on the wave guide layer 103 with a predetermined force so as to even more precisely control the vertical position/alignment of the wave guides (y dimension). Particularly, the cores and cladding of a typical optical waveguide actually are somewhat resilient, having a Shore durometer value typically of about D 70 and D 50, respectively. Thus, a predetermined amount of pressure can be chosen so as to press the cores and cladding down into the V-grooves a desired amount to precisely align them vertically before they are cured in place. Alternately or additionally, the die includes a stop face 425 that is positioned to contact the top of the jig 200 and is disposed at a height relative to the main portion 424 of the die (the portion that goes into the ferrule cavity 114 and touches the waveguide layer 103) to cause the press face 426 of the main portion 424 to stop at a specifically defined height above the bottom of the window 204 of the jig 200, as will be discussed in more detail below in connection with FIGS. 5A-5D.

As an alternate to temperature curing, the adhesive may be cured by ultraviolet or light curing. Such alternate curing techniques have the advantage of not requiring exposing the ferrule to high temperatures, which can create manufacturing difficulties when the various materials being heated have different coefficients of thermal expansion.

Figure 4G:
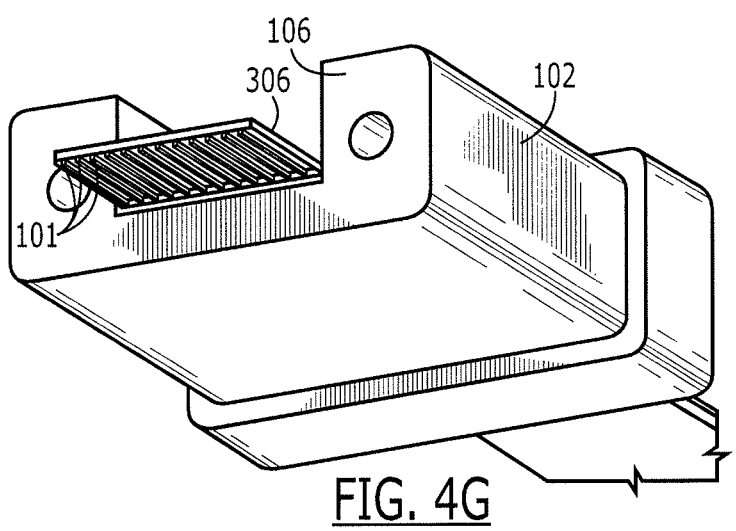

FIG. 4G is a perspective view showing the ferrule 102 and waveguide layer 103 at this point in this process. As can be seen, the cores 101, substrate 306 and first cladding layer 304a are extending past the front face 106 of the ferrule 102.

Figure 4H:
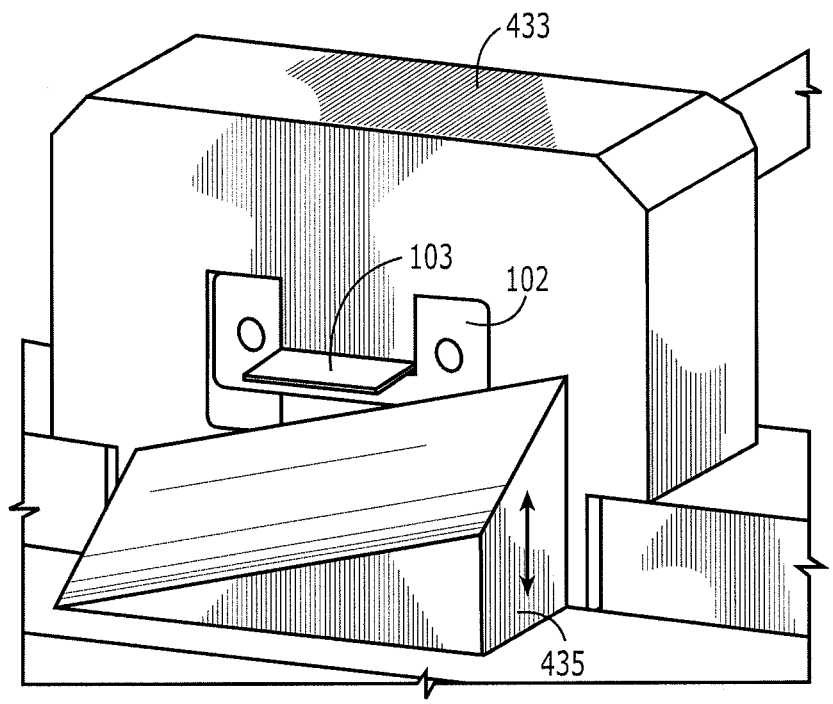
Figure 4I:
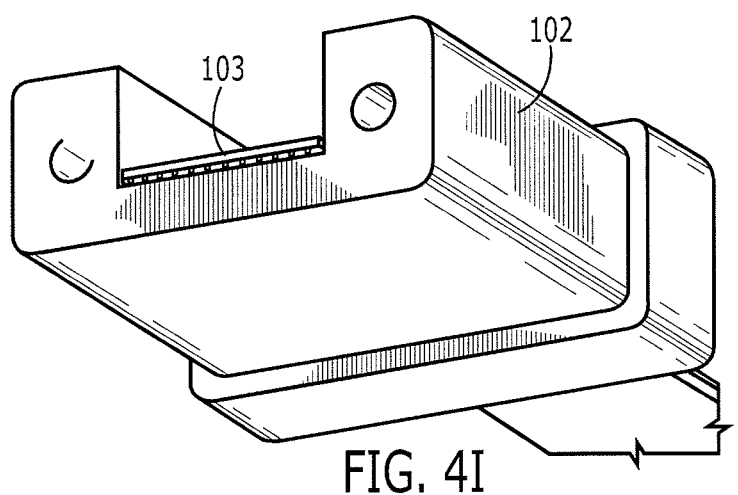
Figure 4J:
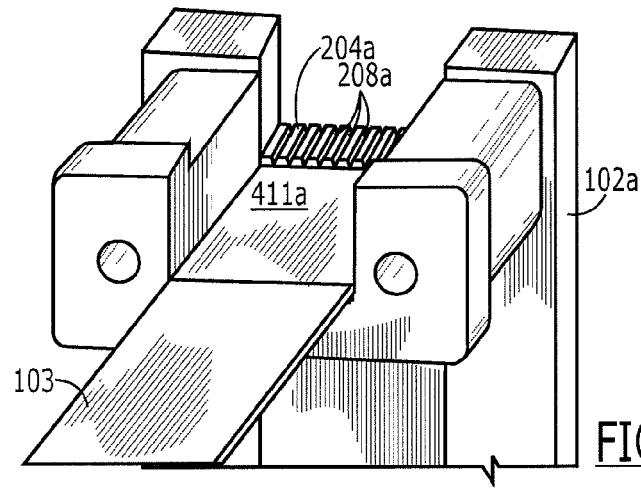

Next, referring to FIG. 4H, the ferrule 102 is placed in a cutting die 433 and a cutting knife 435 cuts the end of the wave guide layer 103 flush with the front face 106 of the ferrule 102. Alternately, the front of the waveguide layer 103 can be removed by laser cleaving. FIG. 4I shows the ferrule 102 and waveguide layer 103 after cutting.

At this point, the first waveguide layer 103 is completely assembled to the ferrule 102.

Figure 4K:
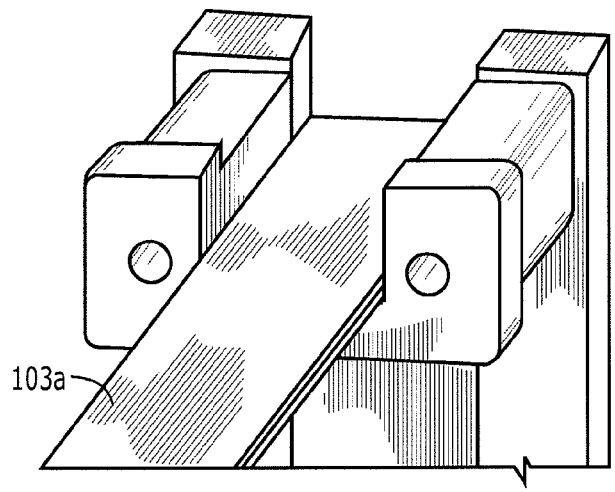
Figure 4L:
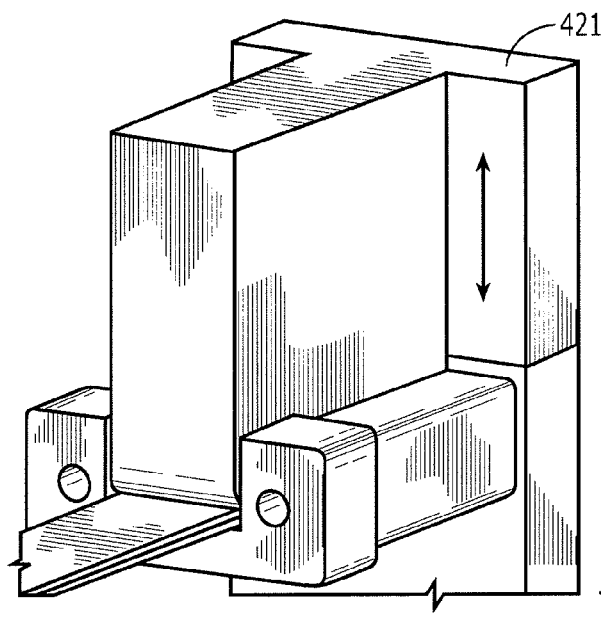

Essentially, the same process described herein above may be repeated for each additional waveguide layer 103. Particularly, with reference to FIG. 4J, the ferrule 102 is next mounted to a different jig 102a. This jig 102a is essentially identical to the first jig 102 except that the bottom wall 204a containing the v-grooves 208a is positioned higher relative to the alignment pins (not shown) by an amount equal to the thickness of one wave guide layer 103 plus one adhesive layer 411. Then, another layer of adhesive 411a is put down on top of the first wave guide layer 103. Referring to FIG. 4K, the next layer of wave guide 103a is placed on top of the adhesive layer 411a. Then, as shown in FIG. 4L, the hot pressured/curing die 421 comes down to apply downward pressure on the waveguide layer 103a and heat the adhesive 411a to cure it.

Figure 4M:
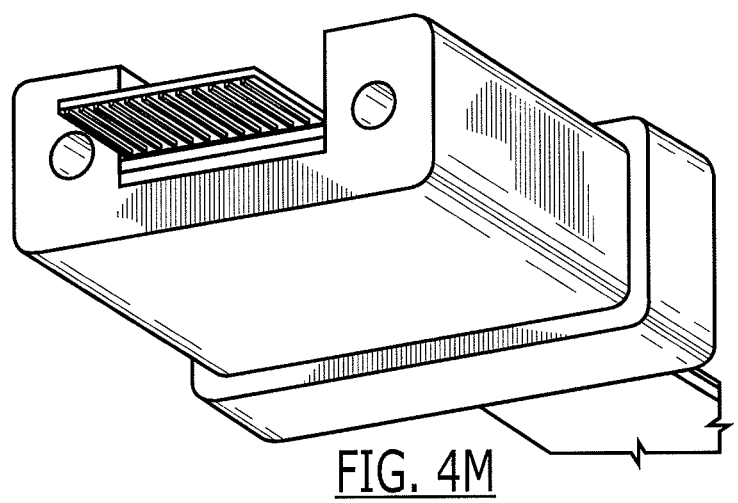
Figure 4N:
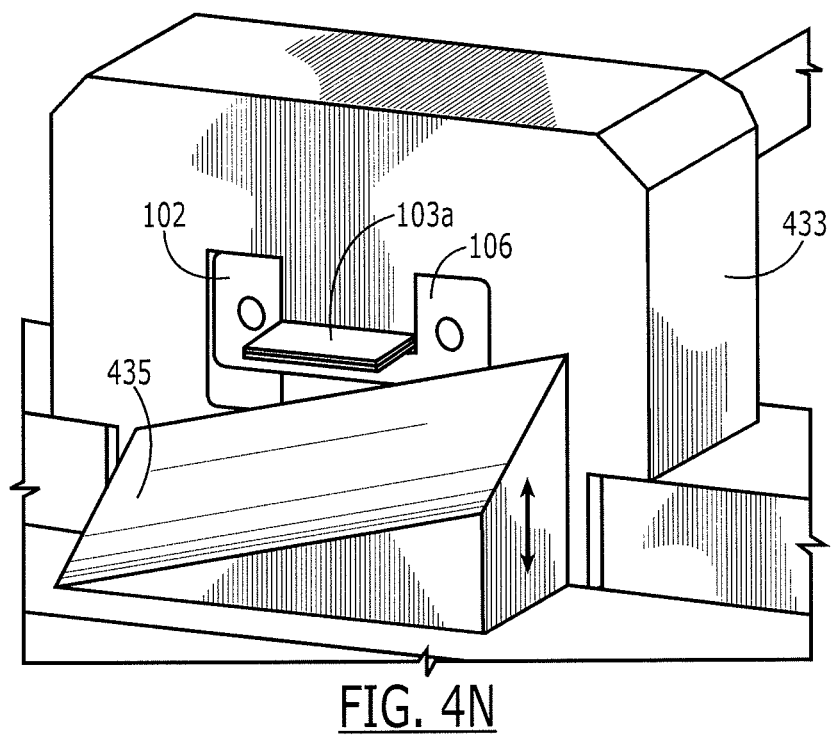
Figure 4C:
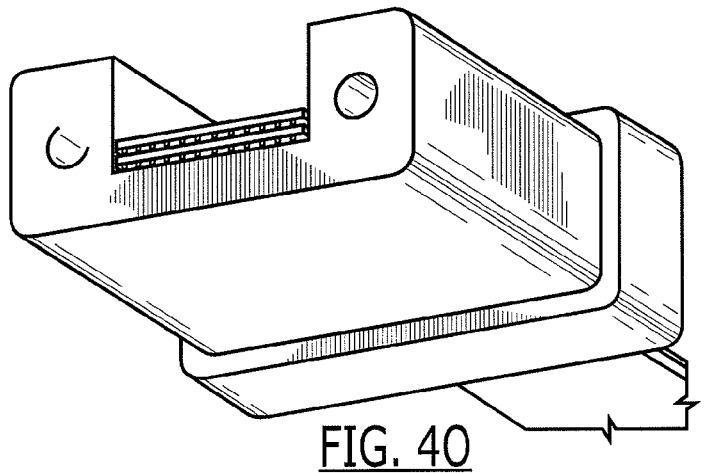

FIG. 4M is a perspective view of the ferrule 102 at this point of the process. Next, as shown in FIG. 4N, the ferrule 102 is again placed in the cutting die 433 and the cutting knife 435 is used to cut the second waveguide layer 103a flush with the front face 106 of the ferrule 102. FIG. 4O shows the ferrule at this point of the process.

The same steps can be repeated for as many waveguide layers as the ferrule will contain.

Next, a cover, such as cover 112 shown in FIGS. 1A and 1B, may be placed in the remaining space of the cavity 114 of the ferrule 102 to close off the cavity and finish the top of the ferrule completely flush. The cover may be adhered to the opening. More particularly, a layer of adhesive may be placed on top of the top-most layer of optical transports and the cover 112 placed on top thereof in contact with the adhesive layer. The adhesive may then be cured to affix the cover in place, such as by heating the entire assembly or by use of the aforementioned hot pressure/curing die 421 on top of the cover 112.

The cover 112 is not necessary for purposes of trapping the waveguides in the cavity insofar as the waveguides are already adhered fixedly in the ferrule and therefore, may be omitted. However, it provides additional structural stability to the ferrule. It further causes the ferrule to look more like a traditional ferrule. Even further, it helps divide forces evenly over two mating ferrules. Particularly, if the ferrules in accordance with the present invention are used for hermaphroditic connector mating, then, when two connectors are mated, the ferrule in one of the connectors will be facing up (e.g., with the cover up) and the ferrule in the other connector will be facing down (e.g., with the cover facing down). Thus, without the covers, the forces in the coupled ferrules may not be evenly distributed because of the asymmetric nature of the mating ferrules without covers. The covers help make the ferrules more symmetric, at least structurally and in terms of force distribution.

In at least one embodiment, a different jig and a different hot pressure/curing die is used for each successive layer of optical transports. With reference to FIG. 2, the various jigs are identical to each other except for the height of the bottom wall 206 of the window 204 relative to the alignment pins 202, the jig for each successive optical transport layer being positioned higher than the bottom wall of the preceding jig by a predetermined amount equal to the height of a layer of optical transports (and any adhesive or other material within the cavity per optical transport layer). For instance, if the combined height of each layer of adhesive and waveguide is 0.25 millimeters, then the bottom wall of the window in each jig would be 0.25 mm higher relative to the alignment pins 202 than the preceding jig. Further, if the stop surface 425 of the die is used to define the height at which the hot pressure die stops relative to the jig/ferrule combination as discussed above in connection with FIG. 4F, then the height of the top surface of the jig also should be higher relative to the alignment pins by the same distance as the bottom wall 206 of the window 204 relative to the preceding jig.

The assembly of the cable/ferrule combination may be entirely automated, employing the use of standard pick and place tools and other common automation mechanisms to move the ferrules between the various stations, switch out the jigs and dies, introduce the optical transports into the ferrules, introduce adhesive into the ferrule cavities, etc.

U.S. patent application Ser. No. 12/836,928 entitled METHOD AND APPARATUS FOR ALIGNING OPTICAL TRANSPORTS IN A FERRULE, which is fully incorporated herein by reference, discloses more details about the above-described ferrule and its fabrication and can be consulted for additional detail.

The invention provides a simple system for aligning a large number of optical transports in a ferrule very efficiently and precisely. The process is time efficient because all of the optical transports in each layer transports are essentially aligned, cured in place, and cut simultaneously.

Further, the jigs can be produced inexpensively because they may be manufactured by two dimensional wire EDM, which can produce extremely accurately machined pieces (e.g., less than one micron tolerances) inexpensively.

In the embodiment shown in FIGS. 1A and 1B, the ferrule cavity 114 is of uniform horizontal width, w1, and the cover has a width essentially equal to width, w1, and simply sits on top of the top-most optical transport layer 103 and is adhered thereto by another layer of adhesive 104.

Figure 5A:
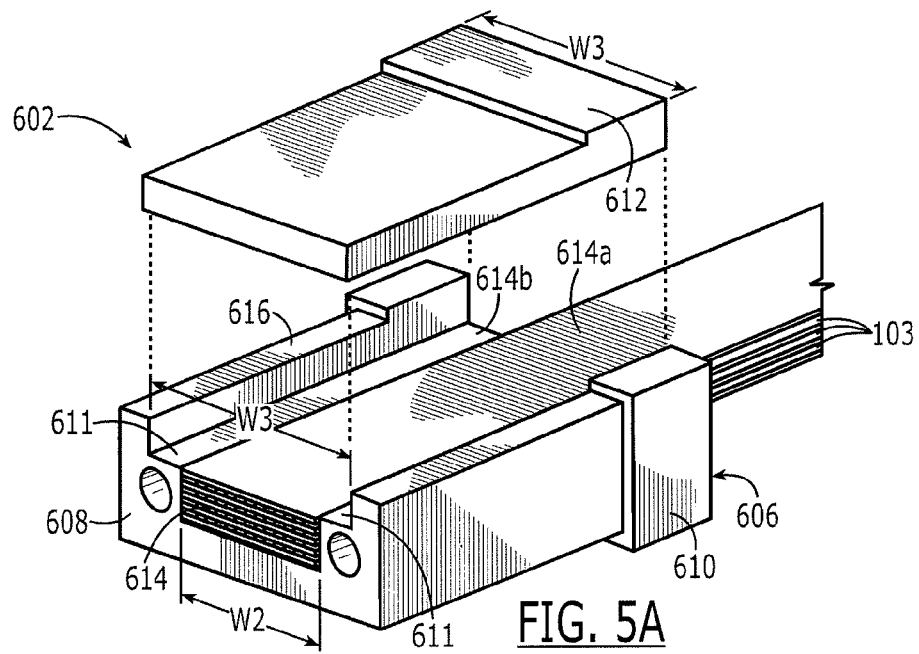
FIG. 5A is a perspective view of a two piece ferrule in accordance with a second embodiment of the invention shown in an unassembled state.
Figure 5B:
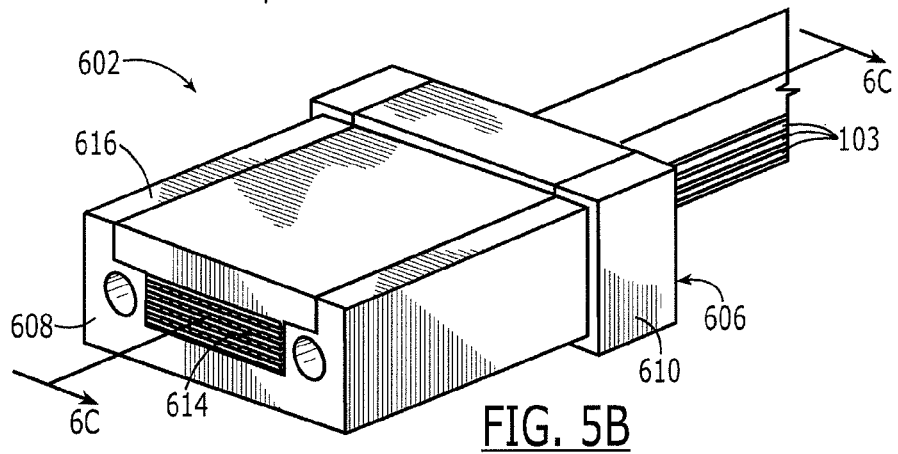
FIG. 5B is a perspective view of the ferrule of FIG. 5A shown assembled.
Figure 5C:
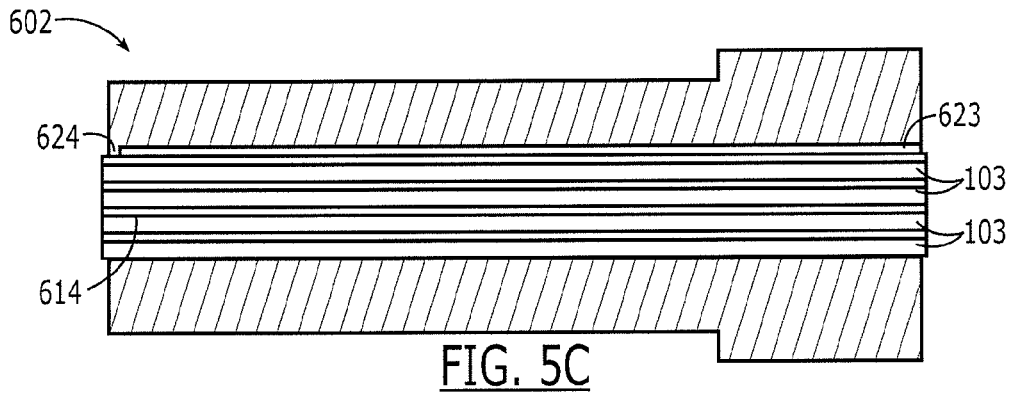
FIG. 5C is a cross sectional side view taken along section C-C of FIG. 5B.

FIGS. 5A, 5B, and 5C illustrate a different embodiment. FIG. 5A is an exploded perspective view of a ferrule main body and cover according to a second embodiment of the invention. FIG. 5B is another perspective view of the second embodiment in a fully assemble state. FIG. 5C is a cross sectional side view taken through section C-C in FIG. 5B.

In this embodiment, the cavity 614 in the ferrule 602 has a pair of longitudinal shoulders 611, thus defining a first segment 614a of the cavity having a first horizontal width, w2, and a second segment 614b of the cavity having a second horizontal width, w3. The cover 612 has a width substantially equal to w3 to fit snugly in the second section 614b of the cavity 614. The optical transports 103 substantially occupy the first segment 614a of the cavity 614, while the cover 612 fully occupies the second segment 614b of the cavity. In this embodiment, the cover 612 rests on the shoulders 611 as well as on the top-most optical transport layer 103. Similarly to the first embodiment, during assembly, a layer of adhesive can be placed on top of the top-most optical transport layer 103 (and on the shoulders 611) during fabrication of the ferrule 602 and the cover 612 can be placed into the cavity from above using a conventional pick and place tool.

Note in the cross-sectional side view of FIG. 5C, that the shoulder and cover are dimensioned so provide a gap 623 between the top of the top-most optical transport layer and the bottom of the cover 612. This gap is for the adhesive that bonds the cover to the optical transports. Further, preferably, a lip 624 is provided at the front end of the cover so as to close off the gap 623 to prevent any adhesive from flowing out of gap 623 at the front end of the ferrule, where it may interfere with the optical transports. A similar lip may provided at the rear face also, but is not recommended because there generally would be no adverse effect from some of the adhesive flowing out of the rear end of the ferrule.

Preferably, the dimensions of the cover are selected so that the cover 612 is flush with the front 608, rear 606, and top 616 faces of the ferrule main body 610.

Figure 6A:
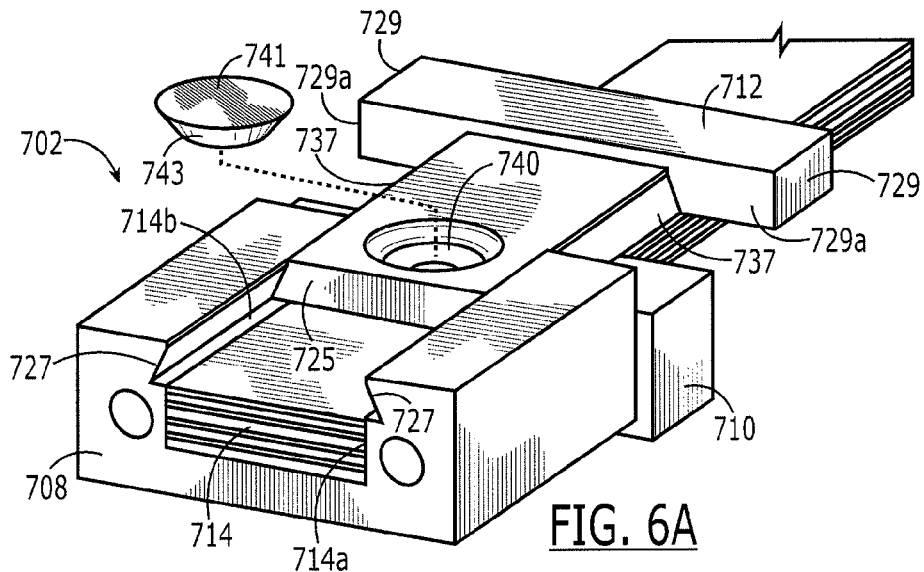
FIG. 6A is a perspective view of a two piece ferrule according to a third embodiment of the invention shown in a partially assembled condition.
Figure 6B:
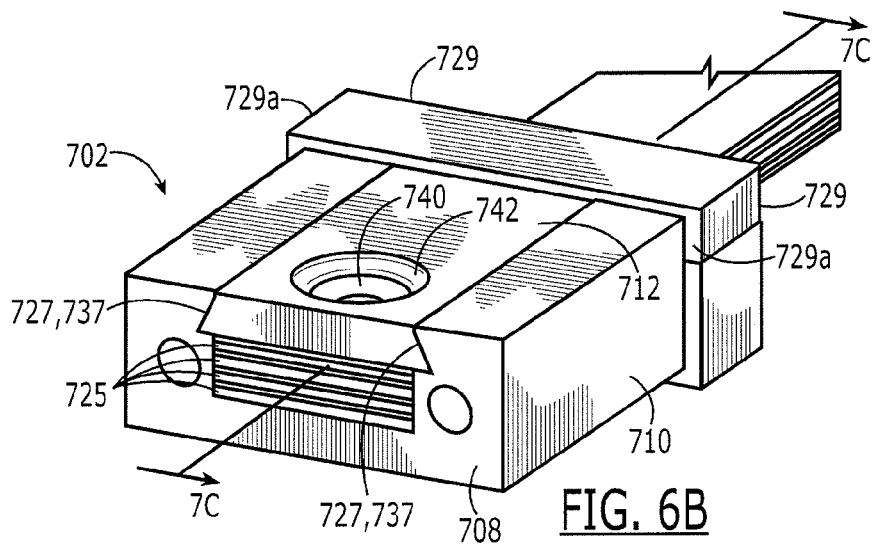
FIG. 6B is a perspective view of ferrule of FIG. 6A shown in a fully assembled state.
Figure 6C:
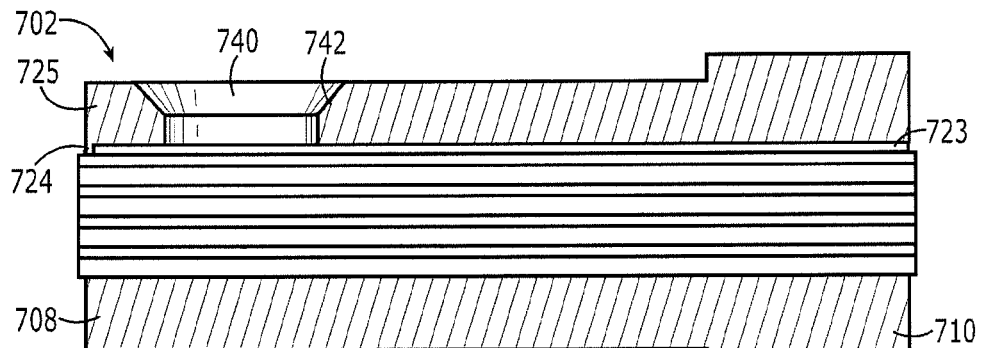
FIG. 6C is a cross sectional side view taken along section C-C of FIG. 6B.

FIGS. 6A, 6B, and 6C illustrate a third embodiment. FIG. 6A is an exploded perspective view of the ferrule assembly showing the cover partially assembled onto the ferrule main body. FIG. 6B is a similar perspective view of the third embodiment fully assembled. FIG. 6C is a cross sectional side view taken through section C-C in FIG. 6B.

This embodiment is similar to the second embodiment of FIGS. 6A-6C in that the cavity 714 comprises two segments 712a, 712b of different widths. In this embodiment, the side walls 727 of the second segment 714b of the cavity 714 are angled inwardly from bottom to top. Likewise, the mating walls 737 of the cover 712 are similarly angled to mate with the walls 727 in the nature of a dovetail type joint.

In this embodiment, the cover 712 is not dropped into the cavity from above, but is instead slid into the second segment of the cavity from the rear because the angled walls 727, 737 will not permit placement from above. An advantage of this embodiment is that the cover is that the mating inwardly slanted main walls 727, 737 provide a mechanical coupling of the cover 712 to the ferrule main body 710 in addition to the adhesive mating, thus providing a potentially stronger attachment of the cover to the ferrule main body.

Two horizontally extending flanges 729 may be provided at the rear end of the cover 712 to assist with the longitudinal alignment (front to rear) of the cover 712 with the ferrule main body 710 during assembly. Particularly, the flanges 729 are designed so that when the front faces 729a of the flanges abut the rear face 706 of the ferrule main body 610, the front face 725 of the cover 712 is flush with the front face 708 of the ferrule main body 710. The cover 712 may be installed simply by sliding it forward until the flanges 729 halt forward movement of the cover 712 relative to the ferrule main body 710 by hitting the rear face 706 of the ferrule main body.

In this embodiment, a hole 740 is provided in the cover 712 so that adhesive may be injected into the cavity 714 through the hole 740. Particularly, in this embodiment, placing a layer of adhesive in the cavity on top of the top-most optical transport layer before the cover is installed and then sliding the cover into place may cause the adhesive to be moved as the cover slides in, possibly leading uneven adhesive coverage. Accordingly, it may be desirable to slide the cover into place and then, subsequently, inject the adhesive into the gap through the hole 740. The hole 740 provides access into the cavity 714 from without the ferrule for injecting adhesive into the cavity after the cover 712 is in position.

As in the previously described embodiment and with reference to the cross sectional side view of FIG. 6C, the ferrule is designed to provide a gap 723 between the top of the optical transports and the bottom surface of the cover 712 for the adhesive to flow into. Again, preferably, a lip 724 is provided at the front end of the cover 712 so as to prevent the adhesive from flowing out of the front end of the ferrule, where it may interfere with the optical transports.

If desired, a cap 741 may be placed in the hole 740 after the adhesive had been inserted in order to close off the hole. In the illustrated embodiment, the hole 740 and the cap 741 are matingly counterbored at 742 and 743, respectively, so that the cap 741 will automatically become vertically aligned in the hole 740 by the mating engagement the angled surfaces of the counterbored hole and cap. The adhesive itself would bond the cap 741 to the cover 712.

Alternately, the adhesive may simply be allowed to fill the hole 740 flush with the top surface of the cover 712. In yet another embodiment, the hole can be left unoccupied.

The employment of the flanges 729 for longitudinal alignment of the cover with the ferrule main body requires the cover to be made to a very tight tolerance. Particularly, the distance between the front faces 729a of the flanges 729 and the front face 725 of the cover 712 should be precisely the longitudinal length of the ferrule main body 710 since the front face 725 of the cover 712 must be precisely flush with the front face 708 of the ferrule main body 710 so as to not to hinder mating of the ferrule 702 to another ferrule.

Thus, in other embodiments, the flanges 729 may be omitted and the cover longitudinally aligned with the ferrule main body by external means, such as described below in connection with the next, fourth embodiment.

Figure 7A:
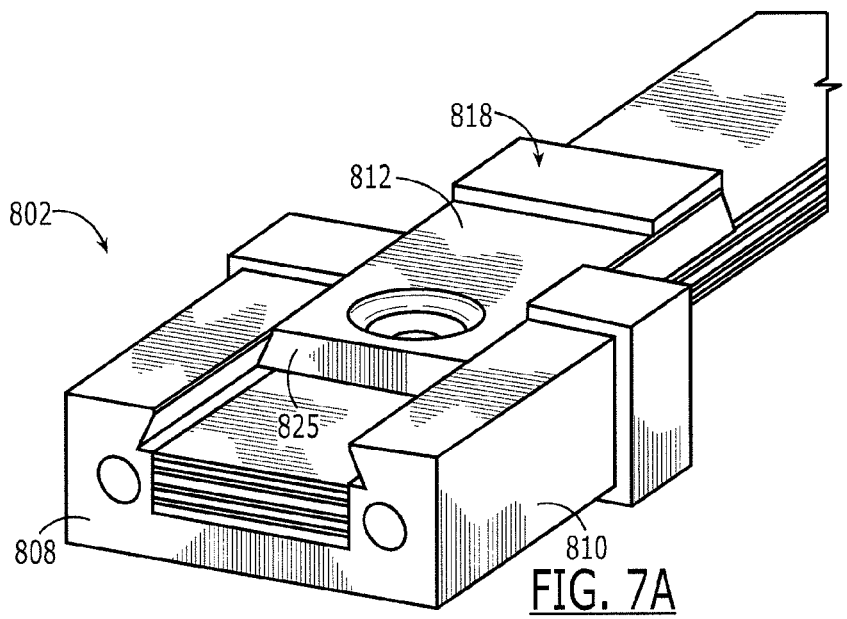
FIG. 7A is a perspective view of a two piece ferrule according to a fourth embodiment of the invention shown in a partially assembled state.
Figure 7B:
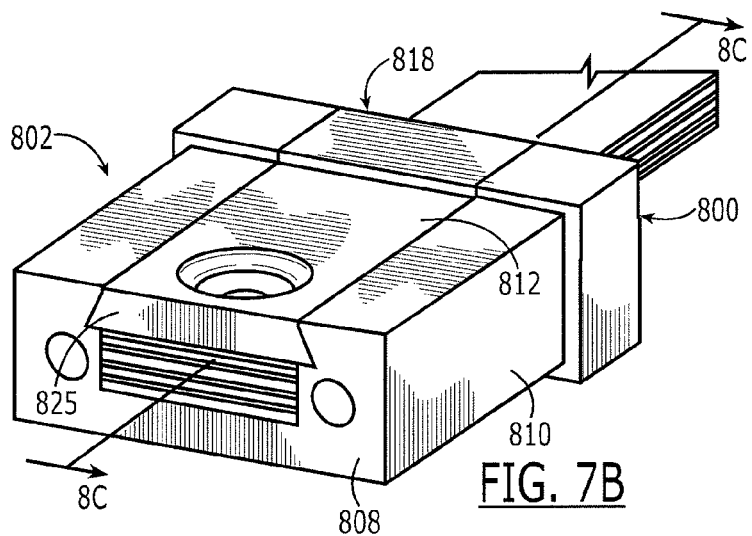
FIG. 7B is a perspective view of the two piece ferrule of FIG. 7A shown in a fully assembled state.
Figure 7C:
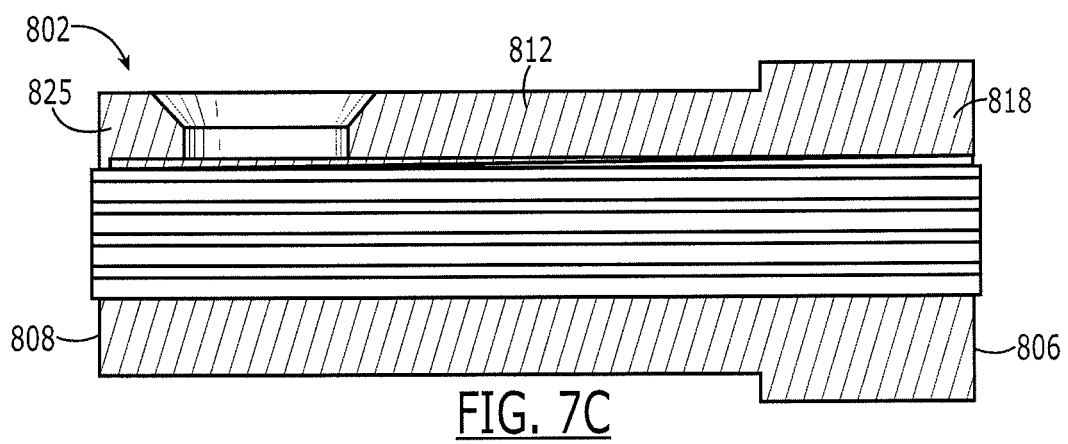
FIG. 7C is a cross sectional side view taken along section C-C of FIG. 7B.

FIGS. 7A, 7B, and 7C illustrate a fourth embodiment. FIG. 7A is an exploded perspective view of the ferrule assembly showing the cover partially assembled onto the ferrule main body. FIG. 7B is a similar perspective view of the third embodiment fully assembled. FIG. 7C is a cross sectional side view taken through section C-C in FIG. 7B.

This embodiment is largely identical to the third embodiment of FIGS. 6A-6C, except without the flanges. In this embodiment, the cover 812 would be longitudinal aligned with the ferrule main body 810 by a mechanism external to the ferrule 802 itself. For instance, the front face 808 of the ferrule main body 810 may be placed against a flat block and the cover 812 can simply be slid in from the rear until the front face 825 of the cover 813 also abuts the block.

Since the only critical aspect of the alignment of the cover 812 in the ferrule main body 810 is that the front face 825 of the cover 812 be precisely flush with the front face 808 of the ferrule main body 810, the overall length of the cover 812 is not critical, i.e., it is not significant if the rear face 818 of cover 812 is not perfectly flush with the rear face 806 of the ferrule. Accordingly, the cover 812 can be manufactured with less precision than in embodiments that incorporate flange feature.

While the specific embodiments discussed above related to waveguides as the optical transports, it should be apparent that the inventive methods and apparatus are equally useful in connection with optical fibers or other optical transports. Furthermore, although the term optical has been used throughout this specification, it is merely exemplary and is not intended to limit the wavelength of the electromagnetic radiation that may be transported in the transports discussed herein. Additionally, note that the use of relative directional terms herein, such as top and bottom or left and right, are for reference purposes only and are used in relation to each other based on an assumed orientation of the relevant object, but are not intended to imply that such object must be in such orientation.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A ferrule for optical transports comprising a main body including a front face, a rear face, and at least one lateral face extending between the front face and the rear face, a longitudinal cavity extending from the front face to the rear face, the longitudinal cavity having a lateral opening to the at least one lateral face, said longitudinal cavity having a bottom surface, said bottom surface being essentially smooth, and a lateral alignment feature on the front face of the ferrule.

2. The ferrule of claim 1 further comprising a cover adapted to close off the lateral opening.

3. The ferrule of claim 2 wherein the cover includes a laterally directed through bore for introducing adhesive into the cavity therethrough.

4. The ferrule of claim 3 wherein the cover has a front longitudinal end and a rear longitudinal end is dimensioned relative to the ferrule main body and optical transports within the cavity of the ferrule main body to provide a gap between the cover and the optical transports for receiving adhesive for adhering the cover to the optical transports, and wherein the cover further includes a lip at a front longitudinal end thereof closing off the gap to a front longitudinal end of the ferrule.

5. The ferrule of claim 2 further comprising a plurality of optical transports disposed in the cavity extending longitudinally between the front face and the rear face.

6. The ferrule of claim 5 wherein the cover is adhered to at least one of the optical transports.

7. The ferrule of claim 2 wherein the cavity further comprises a pair of shoulders on which the cover rests.

8. The ferrule of claim 7 wherein the cavity further comprises a pair of inwardly angled, parallel, longitudinal side walls disposed above the shoulders and the cover further comprises a pair of matingly inwardly angled, parallel, longitudinal side walls adapted to engage the side walls of the ferrule main body so that, when the longitudinal side walls of the ferrule main body engage the longitudinal side walls of the cover, the cover cannot move laterally relative to the ferrule main body.

9. The ferrule of claim 7 wherein the cover comprises a pair of parallel, angled, longitudinal side walls and the cavity of the ferrule main body comprises a pair of angled, longitudinal side walls disposed to engage the side walls of the cover to form a dovetail type longitudinally slidable engagement between the cover and the ferrule main body.

10. The ferrule of claim 8 wherein the cover further includes a through hole that provides access into the cavity from without the ferrule through which hole adhesive may be introduced into the cavity after the cover has been installed on the ferrule main body.

11. The ferrule of claim 2 wherein the cover comprises a main cover portion having a front face and a rear end and wherein the main cover portion fills the lateral opening of the cavity of the ferrule main body, the cover further comprising at least one flange extending rearwardly from the rear end of the main cover portion and laterally outwardly of the cavity so that the at least one flange cannot pass into the cavity, whereby the cover may be slid forwardly in the cavity until the point where the flange engages the rear end of the ferrule main body.

12. The ferrule of claim 11 wherein the front face of the cover is a predetermined longitudinal distance from the flange so that the front face of the cover will be flush with the front face of the ferrule main body when the flange engages the rear face of the ferrule main body.

13. The ferrule of claim 1 wherein the at least one lateral face comprises four lateral faces, and wherein the lateral opening is in one of the four lateral faces.

14. A method of assembling a plurality of optical transports within a ferrule:
having a ferrule main body having a front face, a rear face, at least one lateral side face extending between the front face and the rear face, a longitudinal cavity running from the front face to the rear face for receiving a plurality of optical transports, the longitudinal cavity having a lateral side opening through the at least one lateral face, and a lateral alignment feature on the front face of the ferrule, said method comprising:
disposing a jig at the front face of said ferrule body, said jig having a jig alignment feature for interengaging said lateral alignment feature to position said jig precisely relative to said front face, said jig defining a plurality of grooves, each groove configured to position precisely an optical transport;
inserting through the lateral opening a plurality of optical transports longitudinally through the cavity in the ferrule; and
disposing each of said optical transports in a groove of said jig, thereby positioning each optical transport precisely in said cavity.

15. The method of claim 14 further comprising:
adhering a cover in the lateral opening of the ferrule main body.

16. The method of claim 15 wherein the cover includes a laterally directed through bore for introducing adhesive into the cavity therethrough and wherein the adhering comprises introducing adhesive into the cavity through the through bore.

17. The method of claim 16 wherein the adhering further comprises longitudinally sliding the cover into engagement with a locking groove in the ferrule main body prior to introducing adhesive through the through hole.

18. The method of claim 14, wherein said lateral alignment feature and said jig alignment feature are at least one alignment pin and at least one alignment hole for receiving said alignment pin.

19. The method of claim 14, further comprising:
applying adhesive to said bottom surface prior to inserting said plurality of optical transports.

20. The method of claim 14, wherein said plurality of optical transports form a first layer of optical transports in said ferrule, said method further comprising:
disposing a second jig at said front face of said ferrule body, said second jig having a jig alignment feature for interengaging said lateral alignment feature to position said second jig precisely relative to said front face, said second jig defining a plurality of grooves, each groove configured to position precisely an optical transport, said plurality of grooves of said second jig being higher than those of said jig relative to said ferrule;
applying adhesive on the top of said first layer of optical transports; and
inserting through said lateral opening a second plurality of optical transports and disposing each of said second plurality of optical transports in a groove of said second jig, thereby positioning the optical transport precisely in said cavity over said first layer of optical transports.

21. The method of claim 20, further comprising:
separately cleaving a portion of said optical transports extending beyond said front face for each layer of optical transports.

* * * * *